July 3, 1956  G. A. DAUPHINAIS  2,752,952
HOSE AND MANUFACTURE THEREOF
Filed Aug. 22, 1951  2 Sheets-Sheet 1

INVENTOR
George A. Dauphinais
by Hoyes Larned & Glenn
his attorneys

July 3, 1956 G. A. DAUPHINAIS 2,752,952
HOSE AND MANUFACTURE THEREOF
Filed Aug. 22, 1951 2 Sheets-Sheet 2
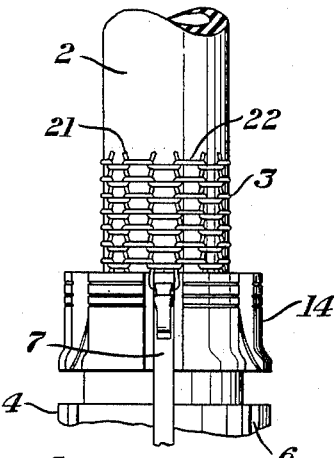
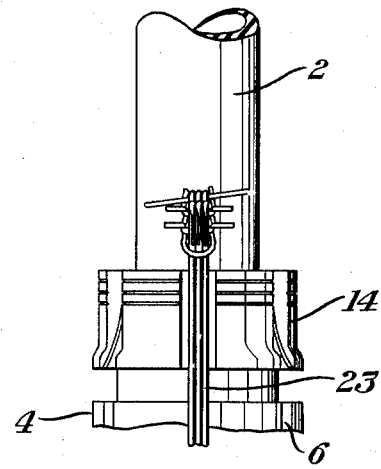
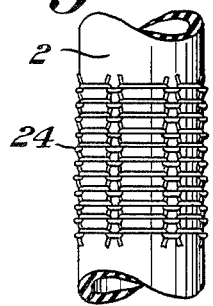
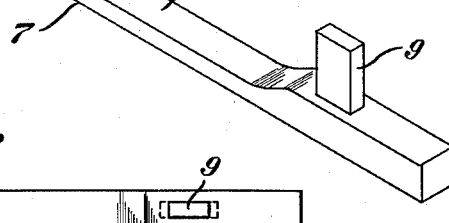
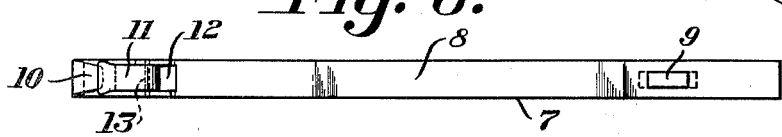
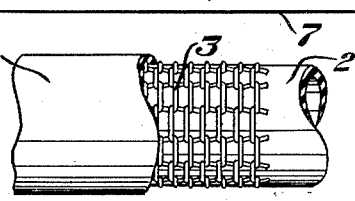
INVENTOR
George A. Dauphinais United States Patent Office 2,752,952
Patented July 3, 1956

2,752,952

HOSE AND MANUFACTURE THEREOF

George A. Dauphinais, Haddonfield, N. J., assignor to Quaker Rubber Corporation, Philadelphia, Pa., a corporation of Pennsylvania Application August 22, 1951, Serial No. 243,104

6 Claims. (Cl. 138—53)

This invention relates to hose and the manufacture thereof. It relates more particularly to hose containing a reinforcement formed of strands cooperatively disposed as a reinforcing tube and to a method of making hose having such a reinforcing tube as a component part thereof.

While my invention is widely applicable to hose having a reinforcing tube as above mentioned I shall for purposes of explanation and illustration describe the invention in connection with the making of hose comprising an inner hollow flexible tubular element with a reinforcing tube comprising cooperating strands thereabout. Such hose is adapted for various uses such as garden hose, automobile cooling system hose, etc. To simplify the explanation of the invention I shall consider specifically the making of garden hose comprising an inner hollow flexible tubular element with a reinforcing tube comprising cooperating strands thereabout.

Garden hose comprises an inner hollow flexible tubular element with a reinforcing tube comprising cooperating strands disposed thereabout and an outer hollow flexible tubular element disposed about the reinforcing tube. A second reinforcing tube may be disposed about the outer hollow flexible tubular element with a further hollow flexible tubular element disposed about the second reinforcing tube. Hose having but one reinforcing tube is called one-ply or single ply hose. Hose having two reinforcing tubes is called two-ply or double ply hose. My invention is applicable to the manufacture of either single ply or double ply hose but for simplicity of explanation it will be described in connection with the manufacture of single ply hose, i. e., hose having inner and outer hollow flexible tubular elements with a reinforcing tube of cooperating strands between the inner and outer hollow flexible tubular elements.

The manufacture of the hose is commenced by forming the inner hollow flexible tubular element. That element may be of any suitable material and formed in any appropriate manner. Normally I prefer to employ an extruded rubber tube as the inner hollow flexible tubular element. There is formed about the inner hollow flexible tubular element reinforcement comprising cooperating strands forming a tube, the inner hollow flexible tubular element wtih the reinforcing tube thereabout consituting an intermediate product or blank in the manufacture of reinforced hose. The strands may be of any suitable reinforcing material, textile strands normally being employed. The strands may be of cotton, rayon or other suitable material. Untwisted rayon has been successfully used for the purpose. The reinforcing tube is formed progressively along the inner hollow flexible tubular element. It is customary to advance the inner hollow flexible tubular element through a reinforcing tube forming machine and form the reinforcing tube continuously along the inner hollow flexible tubular element as it passes through the machine. The reinforcing tube, since it has extent both circumferentially of the inner hollow flexible tubular element and also longitudinally of that element, comprises strands extending generally circumferentially and generally lengthwise of the inner hollow flexible tubular element, a given strand normally extending both circumferentially and lengthwise of that element. When fluid under pressure is introduced into the blank comprising the inner hollow flexible tubular element with the reinforcing tube thereabout the strands of the reinforcing tube tend to resist the tendency of the inner hollow flexible tubular element to increase in dimension radially and also tend to resist the tendency of the inner hollow flexible tubular element to increase in dimension axially. A given strand may be and normally is subjected to both the tendency of the inner hollow flexible tubular element to increase in dimension radially and the tendency of the inner hollow flexible tubular element to increase in dimension axially.

The stranded reinforcing tube may be formed by braiding, knitting, plaiting, weaving or otherwise. While my invention in its broader aspects is applicable to hose embodying a stranded reinforcing tube formed otherwise than by knitting and the manufacture thereof my invention in certain of its more specific aspects is confined to hose having a knit reinforcing tube and the manufacture thereof. Consequently in the specific description of certain present preferred embodiments of the invention and certain present preferred methods of practicing the same which is to follow I shall deal with the manufacture of hose having a knit reinforcing tube.

Circular knitting machines are very old and well known. A circular knitting machine knits progressively or continuously a hollow knit product. A common form of circular knitting machine adapted to the hose manufacturing art comprises a hollow needle cylinder through which the inner hollow flexible tubular element passes while the reinforcing tube is knit about the inner hollow flexible tubular element, means being provided for moving the inner hollow flexible tubular element through the needle cylinder as the knit reinforcing tube is formed thereabout. The needle cylinder may, for example, be arranged with its axis vertical and the inner hollow flexible tubular element may be passed upwardly therethrough as the reinforcing tube is being knit thereabout.

After the reinforcing tube has been knit about the inner hollow flexible tubular element an outer hollow flexible tubular element is applied over the blank comprising the inner hollow flexible tubular element with the knit reinforcing tube thereon. For example, the blank comprising the inner hollow flexible tubular element with the knit reinforcing tube thereon may have the outer hollow flexible tubular element extruded thereabout as well known to those skilled in the art. For purposes of example the outer hollow flexible tubular element, as well as the inner hollow flexible tubular element, may be considered as being of rubber.

Before the outer hollow flexible tubular element may be extruded about the blank comprising the inner hollow flexible tubular element with the knit reinforcing tube thereon it is necessary to introduce and maintain fluid, commonly air, under pressure within the inner hollow flexible tubular element to enable the inner hollow flexible tubular element to resist the inward pressure imposed during the extrusion about the blank of the outer hollow flexible tubular element.

With reference to the making of single ply reinforced rubber hose, when the outer rubber tubular element has been applied over the blank comprising the inner rubber tubular element with the knit reinforcing tube thereabout the result is a further composite hose blank in which the knit reinforcing tube is disposed between rubber tubes. Such composite hose blank is passed through a lead press where it is encased in a sheath of lead as well known to those skilled in the art. Normally the fluid under pressure introduced into the blank comprising the inner hollow flexible tubular element with the knit reinforcing tube thereon preparatory to extruding thereabout the outer hollow flexible tubular element is maintained under pressure in the blank throughout the remainder of the manufacture of the hose. When the blank comprising the reinforcing tube disposed between inner and outer hollow flexible tubular elements is passed through the lead press the internal fluid pressure may, if desired, be increased. The blank with fluid under pressure therein and the lead sheath thereabout is subjected for a predetermined time to the temperature required for vulcanization as well known in the art whereby the inner and outer rubber tubular elements are vulcanized to each other with the knit reinforcing tube disposed within the wall of the vulcanized rubber tube thus produced, whereafter the lead sheath is removed.

The method above described is the method which has been employed for many years in the manufacture of garden hose. Prior to my invention it was customary to arrange the strands of the reinforcing tube with the strand density per unit of linear measurement generally circumferentially thereof equal to or greater than the strand density per unit of linear measurement generally lengthwise thereof. The result was a quite substantial radial expansion of the inner rubber tubular element upon the application of internal pressure to the blank comprising the inner rubber tubular element with the knit reinforcing tube thereon preparatory to the application of the outer tubular element thereover and a substantial radial expansion upon increase of the pressure or upon subsequent application of pressure. Such expansion was accompanied by relative movement of the strands of the reinforcing tube to readjust themselves under the new stress conditions imposed. Such readjustment relatively to one another of the strands of the reinforcing tube was especially pronounced when the reinforcing tube was knit as the same strands extend throughout the knit fabric both circumferentially and lengthwise thereof. The circumferentially extending strands lengthed with a consequent shortening of the longitudinally extending strands. Such relative movement of the strands of the reinforcing tube resulted in foreshortening of the blank since the reinforcing tube increased in diameter and decreased in length and due to its intimate association with the rubber caused the rubber to shrink lengthwise with it. Such shrinkage was very substantial, ranging from ten per cent to as high as thirty per cent of the initial length of the blank depending upon the partirular materials employed and conditions imposed. The effect of such shrinkage was to seriously reduce the footage of finished hose produced by the use of given quantities of materials and at the same time make a weaker hose than should be made by the material going into the manufacture of the hose since, although the strands of the reinforcing tube readjusted themselves to a considerable extent upon radial expansion of the inner rubber tubular element, because of being pressed tightly against the inner rubber tubular element during such expansion they were prevented by friction from readjusting themselves to a condition of uniform stress throughout which is the condition of maximum strength.

The art went along for many years making hose in the manner above described, suffering a serious loss in production by reason of the shrinkage of the blank upon the application of internal pressure thereto and also suffering a decrease in strength relative to the strength which should be produced by the materials employed. Those skilled in the art found no solution to the problem and to this day those hose manufacturers who do not have the benefit of my invention are still making hose in the same way and suffering the same disadvantages.

I have discovered how to inhibit the shrinkage of the blank upon the application of internal pressure thereto and obtain in the hose a strength closely approaching the maximum theoretical strength obtainable from the materials employed. I provide for arranging the respective strands of the reinforcing tube under substantially uniform stress in the unvulcanized blank so that the strands do not partake of material relative movement when pressure is applied to the interior of the blank as above described. Since the strands are initially under substantially uniform stress the tendency toward lengthwise shrinking of the blank is minimized. Moreover, since the strands do not move substantially relatively to one another upon the application of internal pressure each strand or strand portion is under substantially the same stress as each other strand or strand portion so that virtually the complete theoretical strength of the reinforcing tube is realized. At the same time I find that I can effect a very substantial saving in reinforcing material. Also I can initially form the inner rubber tubular element larger than has previously been possible whereby the expansion or stretching of the rubber of that element prior to application of the outer rubber tubular element is minimized and a greater proportion of the inherent strength of the rubber is made available. In short, I provide a greatly superior hose at materially reduced cost.

I accomplish my improved results by doing exactly the opposite of what has always been considered by those skilled in the art to be the proper practice in the manufacture of reinforced hose. As above stated, it has always been considered prior to my invention that the strand density per unit of linear measurement generally circumferentially of the reinforcing tube should be greater than or at least equal to the strand density per unit of linear measurement generally lengthwise of the reinforcing tube. For example, in a typical garden hose made prior to my invention there were twenty-four longitudinally extending strands as against eighteen and one-half circumferentially extending strands in a length of the tube equivalent to its circumference. I have found that the strand density per unit of linear measurement generally lengthwise of the reinforcing tube should be at least about one and one-half times as great as the strand density per unit of linear measurement generally circumferentially of the reinforcing tube and for optimum results should be about twice as great. I obtain superior results up to a condition in which the strand density per unit of linear measurement generally lengthwise of the reinforcing tube is about two and one-half times the strand density per unit of linear measurement generally circumferentially of the reinforcing tube. In practice I prefer to make the strand density per unit of linear measurement generally lengthwise of the reinforcing tube between about one and one-half and about two times as great as the strand density per unit of linear measurement generally circumferentially of the reinforcing tube.

I further provide hose comprising an inner hollow flexible tubular element with knit reinforcement thereabout, the knit reinforcement comprising interlooped strands forming a tube having rows of loops extending generally about the inner hollow flexible tubular element and wales of loops extending generally along the inner hollow flexible tubular element, the strand density per unit of linear measurement generally lengthwise of the reinforcing tube being at least about one and one-half times as great as the strand density per unit of linear measurement generally circumferentially of the reinforcing tube. The strand density per unit of linear measurement generally lengthwise of the reinforcing tube is preferably about twice as great and may be as much as about two and one-half times as great as the strand density per unit of linear measurement generally circumferentially of the reinforcing tube.

While my results may be accomplished in various ways, I find that I can obtain quite satisfactory results by modifying in a comparatively simple way existing knitting machines adapted for the knitting of reinforcing tubes about inner hollow flexible tubular elements. I preferably reduce the number of wales formed in the knit reinforcing tube. While reducing the number of wales I preferably maintain the length of the loops substantially as before. The result is a decrease in the strand density per unit of linear measurement generally circumferentially of the reinforcing tube without a substantial corresponding decrease of the strand density per unit of linear measurement generally lengthwise of the reinforcing tube. I find that in the manufacture of hose of the type of the typical hose above referred to having twenty-four longitudinally extending strands and eighteen and one-half circumferentially extending strands in a length equal to the circumference of the tube the number of longitudinally extending strands can be cut in half. I have produced very satisfactory hose having twelve longitudinally extending strands and from seventeen to twenty-four circumferentially extending strands in a longitudinal distance equal to the circumference of the tube. The number of circumferential strands may be somewhat further increased in relation to the longitudinal strands while obtaining superior results.

In modifying an existing knitting machine I reduce the number of wales of the knit reinforcing tube with a corresponding saving of reinforcing material. I may reduce the number of wales in a particular knit reinforcing tube from twelve to six. That may be accomplished by removing every other needle from the needle cylinder. The result is a knit reinforcing tube with six wales of normal width separated by spaces between wales, each space between wales having a dimension circumferentially of the tube equal to the width of one wale plus the width of two normal spaces. A reinforcing tube thus produced has the strand density per unit of linear measurement generally lengthwise of the reinforcing tube at least about one and one-half times as great as the strand density per unit of linear measurement generally circumferentially of the reinforcing tube and the longitudinal and transverse strands in the reinforcing tube as knit are under substantially uniform stress. When the blank comprising the outer rubber tubular element with the knit reinforcing tube thereon is inflated there is very little relative movement of the strands of the reinforcing tube since prior to introduction of the compressed air the longitudinal and transverse strands were already under substantially uniform stress. The result is elimination of most or all of the lengthwise shrinkage of the blank and utilization of close to the entire strength of the reinforcing material while effecting a substantial saving in reinforcing material. I effect an increase in footage of completed hose ranging between ten and thirty per cent. with the use of less material, the hose having greater uniformity of strength than hose made prior to my invention. The original length of rubber tube and the original length of reinforcing tube are utilized with little or no diminution. The bursting strength of the hose is substantially the same as the bursting strength of the hose referred to made prior to my invention utilizing a substantially greater quantity of material per foot of hose.

While from the standpoint of manufacture and performance of the finished hose, hose having a knit reinforcement with relatively narrow relatively widely separated wales is quite satisfactory, the knit reinforcement is sometimes vaguely distinguishable through the outer rubber tubular element and the appearance of such hose is considered to be such that it does not have quite the sales appeal of hose having wales spaced apart a distance approximating the width of the wales. To enable the fabrication of the knit reinforcing tube with wales spaced apart a distance approximating the width of the wales while maintaining the desired reduced strand density per unit of linear measurement generally circumferentially of the reinforcing tube I have devised a further refinement of existing knitting apparatus involving the use of novel needle means. I preferably employ needle means in which the thickness of the hook generally in a direction perpendicular to the plane of the hook is greater than the transverse internal dimension of the hook through its center. The transverse internal dimension of a knitting needle hook through its center is determined in relation to the mean diameter of the strand which is to be knitted by use of the hook. Knitting needles as heretofore produced had conventional characteristics rendering them unadapted for my purpose now under discussion. I preferably make the thickness of the hook of my knitting needle means generally in a direction perpendicular to the plane of the hook a dimension of the order of a multiple of the transverse internal dimension of the hook through its center. I have devised a new knitting needle comprising a shank and a hook at the end of the shank, the thickness of the hook generally in a direction perpendicular to the plane of the hook being greater than the transverse internal dimension of the hook through its center, preferably of the order of a multiple of such transverse internal dimension. I may accomplish the result by using a plurality of conventional needles arranged side by side in the same needle groove in the needle cylinder. If a plurality of needles are thus arranged side by side in the same needle groove in the needle cylinder they may be connected together, as, for example, by welding, to form in effect a single wide needle although it is possible to accomplish my results without thus connecting together needles arranged side by side in the same needle groove. When the needles are not connected together the needle cam operates them seriatim which does not affect the results obtained but introduces a difficulty in threading the needles, especially when a strand such as untwisted rayon is used.

Whether I employ a single wide needle in each groove or a plurality of conventional needles side by side in each groove, I form each needle groove in the needle cylinder much wider than normal to receive the wide needle or the plurality of conventional needles arranged side by side. The wide needle grooves are preferably spaced apart circumferentially of the needle cylinder a distance such that the width of each wale will be substantially equal to the distance between wales so that the knit reinforcing tube will have a uniform all-over appearance which is believed to enhance the sales appeal of the hose and also somewhat more evenly distributes the strength of the reinforcing tube.

I obtain excellent results by spacing apart a distance equal to at least six times the mean diameter of the strands the opposed sides of each loop which extend generally in the direction of the length of the wales with the wales spaced apart distances of the same order. Such spacing may be made even greater with satisfactory results. Thus there is formed a uniform open knit reinforcing tube having advantages as explained above. The respective strands of the reinforcing tube are under substantially uniform stress so that the strands do not partake of material relative movement when fluid is admitted into the interior of the blank prior to vulcanization under sufficient pressure to cause the material of the inner hollow flexible tubular element to swell out between the strands of the reinforcing tube.

I provide a method of making hose having an inner hollow flexible tubular element with reinforcement thereabout comprising making a blank by forming the reinforcement out of cooperating strands as a tube about the inner hollow flexible tubular element with the respective strands of the reinforcing tube under substantially uniform stress, admitting fluid into the interior of the blank under sufficient pressure to cause the material of the inner hollow flexible tubular element to swell out against the strands of the reinforcing tube and due to the uniformity of the stress in the strands of the reinforcing tube maintaining the length of the thus inflated blank not substantially less than the length of the blank prior to inflation thereof. Preferably the reinforcement is knit about the inner hollow flexible tubular element. Preferably the strand density per unit of linear measurement generally lengthwise of the reinforcing tube is at least about one and one-half times as great as the strand density per unit of linear measurement generally circumferentially of the reinforcing tube. As explained above, for optimum results the strand density per unit of linear measurement generally lengthwise of the reinforcing tube should be about twice the strand density per unit of linear measurement generally circumferentially of the reinforcing tube but I obtain eminently satisfactory results if the ratio is somewhat less than two; also the ratio may be increased to somewhat more than two with satisfactory results.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same in which Figure 1 is a fragmentary vertical cross-sectional view, somewhat diagrammatic, of a portion of a circular knitting machine for knitting a reinforcing tube about an inner hollow flexible tubular element and showing the knitting of such a reinforcing tube in progress;

Figure 2 is a fragmentary diagrammatic view showing the formation of a knit reinforcing tube on an inner hollow flexible tubular element, all needles of the knitting machine except one being omitted for clarity of showing;

Figure 3 is a fragmentary view similar to Figure 2 showing the employment of a different form of needle means;

Figure 4 is a fragmentary diagrammatic view showing a modified form of knit reinforcement;

Figure 5 is an isometric view of a knitting needle;

Figure 6 is a face view of the needle shown in Figure 5;

Figure 7 is an edge view of the needle shown in Figures 5 and 6; and

Figure 8 is a fragmentary diagrammatic view showing the stages of manufacture of reinforced hose.

Figure 1:
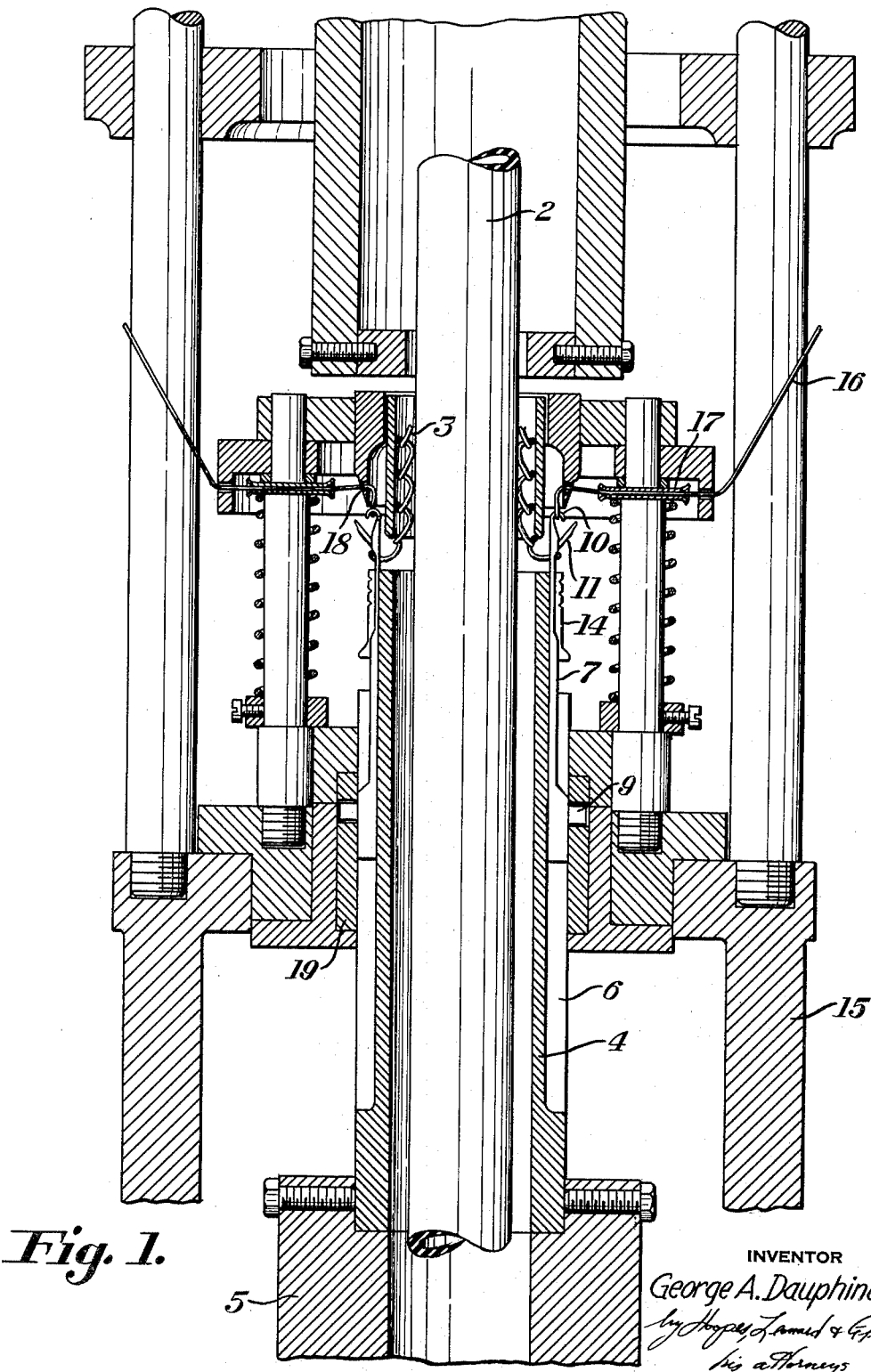

Referring now more particularly to the drawings, Figure 1 shows a circular knitting machine for knitting a reinforcing tube about an inner hollow flexible tubular element. The inner hollow flexible tubular element is designated 2. It moves continuously through the knitting machine in a vertically upward direction in time with the formation of the knitted reinforcing tube thereabout. The element 2 is fed by any suitable means as known to those skilled in the art. The knit reinforcing tube is designated 3 and is formed in the knitting machine and about the element 2 as the element 2 moves upwardly therethrough.

The knitting machine comprises a needle cylinder 4 carried by a stationary support 5. The needle cylinder 4 is a hollow cylinder with its axis vertical through which the element 2 passes. The needle cylinder 4 has in its outer cylindrical surface extending parallel to its axis needle grooves 6. Each needle groove 6 is much wider than a normal needle groove in such a machine, being in the form shown approximately three times normal width. Disposed in each needle groove 6 for vertical up and down sliding movement therein guided by the sides of the needle groove is a knitting needle 7 which is much wider than a normal or conventional knitting needle. Each knitting needle 7 comprises a shank 8, a butt 9, a hook 10 and a latch 11 pivoted in a recess 12 in the needle shank 8 by a pivot pin 13. The thickness of the hook 10 generally in a direction perpendicular to the plane of the hook, i. e., in the up and down direction viewing Figure 6, is greater than the transverse internal dimension of the hook through its center. In this respect the needle departs entirely from prior practice. The purpose of the widened needle is to form wales much wider than can be formed with conventional needles made for use with a strand such as is employed for forming the knit reinforcing tube 3. Each needle 7 forms loops the opposed sides of which extending generally in the direction of the length of the wales of the knit fabric are spaced apart a distance equal to at least six times the mean diameter of the strands. There are six needle grooves 6 in the needle cylinder 4, the needle grooves being equally spaced circumferentially of the needle cylinder. At the top of the needle cylinder 4 sinkers 14 are disposed between the grooves 6 to hold up the already knitted fabric and insure drawing of each loop being formed through the previously formed loop in the same wale. Each of the sinkers 14 has a circumferential dimension equal to approximately one-twelfth of the circumference of the needle cylinder 4 at its top, the spaces between wales of the knitted fabric being approximately equal to the width of the wales.

The remainder of the knitting machine is conventional. It comprises a rotary head 15 carrying six spools of untwisted rayon 16 and guides 17 and 18 through which each strand of rayon passes to be fed to the needles. The rotary head 15 also carries a needle cam 19 which turns with the rotary head and sequentially moves the needles up and down in the grooves 6 as known in the art. The knitting machine is conventional except for the needles and needle grooves and the mode of forming the loops to knit the reinforcing tube 3 is the same as on any conventional knitting machine. Therefore it is unnecessary to describe in detail the structure and operation of the knitting machine.

Figure 8 shows hose in three steps of manufacture. At the right hand side of the figure is shown the uncovered inner hollow flexible tubular element 2. At the center of the figure the element 2 is shown as having been covered with a knit reinforcing tube 3. At the left the outer hollow flexible tubular element 20 is shown as being applied about the inner element 2 with the reinforcing tube 3 thereon. The tube 3 comprises interlooped strands 21 forming a tube having rows of lops 22 extending generally about the inner hollow flexible tubular element and wales of loops 22 extending generally along that element. The strand density per unit of linear measurement generally lengthwise of the reinforcing tube 3 is at least about one and one-half times as great as the strand density per unit of linear measurement generally circumferentially of the reinforcing tube. The cross-sectional area of the strands of the reinforcing tube is substantially uniform throughout. Since there are six interlooped wales there are twelve longitudinal strands. The circumference of the reinforcing tube 3 is of the order of two to two and one-half inches. In a length of the tube equal to the circumference thereof there are preferably from seventeen to twenty-four or more circumferential strands. Thus the strand density per unit of linear measurement generally lengthwise of the reinforcing tube is preferably between about one and one-half and about two and one-half times the strand density per unit of linear measurement generally circumferentially of the reinforcing tube.

Figure 2 shows the reinforcing tube 3 being formed. The opposed sides of each loop 22 which extend generally in the direction of the length of the wales are spaced apart a distance equal to at least six times the means diameter of the strands and the width of the wales is approximately equal to the spaces between wales, thus forming a uniform pattern which for reasons above mentioned is preferred from the standpoint of sales appeal and also is superior in that it is of very uniform strength throughout. When compressed air is introduced into the blank consisting of the unvulcanized inner hollow flexible tubular element 2 with the reinforcing tube 3 thereover there is very little relative movement of the strands of the knit fabric since due to the control of the strand density in the respective directions are above explained all strands are prior to pressurizing of the blank under substantially uniform tension. The tubular element 2 is not substantially foreshortened and its diameter is not increased to the extent to which the diameter of such element was increased upon pressurizing prior to my invention. Consequently I can use a hollow flexible tubular element of greater diameter to start with, the material of the element being expanded very little due to the pressurizing step. The result is a stronger and more uniform structure.

Figure 3 is a view similar to Figure 2 but showing three conventional knitting needles 23 disposed side by side in a needle groove 6. The result accomplished by the three conventional needles 23 operating side by side in the same needle groove is the same as the result accomplished by the use of my special wide needle 7. The respective needles 23 may be unconnected with each other except through friction or they may be connected together to form a unit, as, for example, by welding. If the needles are not connected together they do not operate exactly in unison since the operative portion of the needle operating cam 19 is inclined but the difference in time of operation is not enough to make any substantial difference in the operation performed or the result obtained.

Figure 4 shows a modified form of knit reinforcing tube 24. The tube 24 is formed by use of a conventional needle cylinder with conventional needles but with every other needle removed. It has the strand density per unit of linear measurement generally lengthwise of the reinforcing tube at least about one and one-half times as great as the strand density per unit of linear measurement generally circumferentially of the reinforcing tube. The loops in the reinforcing tube 24 are of conventional width and widely spaced apart. Most of my advantages reside in the structure shown in Figure 4 although that shown in Figure 2 is preferred.

The knitting needle herein disclosed is claimed in co-pending divisional application Serial No. 309,493, filed September 13, 1952.

While I have shown and described certain present preferred embodiments of the invention and have illustrated certain present preferred methods of practicing the same it is to be distinctly understood that the invention is not limited thereto but may be otherwise variously emboded and praciced withn the scope of the following claims.

I claim:

1. Hose comprising an inner hollow flexible tubular element with knit reinforcement thereabout, the knit reinforcement comprising interlooped strands forming a tube having rows of loops extending generally about the inner hollow flexible tubular element and wales of loops extending generally along the inner hollow flexible tubular element, the opposed sides of each loop which extend generally in the direction of the length of the wales being spaced apart a distance equal to at least six times the mean diameter of the strands and of the same order as the distance between adjacent wales.

2. Hose comprising an inner hollow flexible tubular element with knit reinforcement thereabout, the knit reinforcement comprising interlooped strands forming a tube having rows of loops extending generally about the inner hollow flexible tubular element and wales of loops extending generally along the inner hollow flexible tubular element, the opposed sides of each loop which extend generally in the direction of the length of the wales being spaced apart a distance equal to at least six times the mean diameter of the strands and of the same order as the distance between adjacent wales, the strand density per unit of linear measurement generally lengthwise of the reinforcing tube being at least about one and one-half times as great as the strand density per unit of linear measurement generally circumferentially of the reinforcing tube.

3. Hose comprising an inner hollow flexible tubular element with knit reinforcement thereabout, the knit reinforcement comprising interlooped strands forming a tube having rows of loops extending generally about the inner hollow flexible tubular element and wales of loops extending generally along the inner hollow flexible tubular element, the opposed sides of each loop which extend generally in the direction of the length of the wales being spaced apart a distance equal to at least six times the mean diameter of the strands and of the same order as the distance between adjacent wales, the strand density per unit of linear measurement generally lengthwise of the reinforcing tube being at least about twice as great as the strand density per unit of linear measurement generally circumferentially of the reinforcing tube.

4. Hose comprising an inner hollow flexible tubular element with knit reinforcement thereabout, the knit reinforcement comprising interlooped strands forming a tube having rows of loops extending generally about the inner hollow flexible tubular element and wales of loops extending generally along the inner hollow flexible tubular element, the opposed sides of each loop which extend generally in the direction of the length of the wales being spaced apart a distance equal to at least six times the mean diameter of the strands and of the same order as the distance between adjacent wales, the strand density per unit of linear measurement generally lengthwise of the reinforcing tube being between about one and one-half times and about two and one-half times as great as the strand density per unit of linear measurement generally circumferentially of the reinforcing tube.

5. A method of making hose having an inner hollow flexible tubular element with knit reinforcement thereabout comprising making a blank by knitting about the inner hollow flexible tubular element, a reinforcing tube comprising interlooped strands having rows of loops extending generally about the inner hollow flexible tubular element and wales of loops extending generally along the inner hollow flexible tubular element with the opposed sides of each loop which extend generally in the direction of the length of the wales spaced apart a distance equal to at least six times the mean diameter of the strands and of the same order as the distance between adjacent wales and with the respective strands of the knit reinforcing tube under substantially uniform stress, admitting fluid into the interior of the blank under sufficient pressure to cause the material of the inner hollow flexible tubular element to swell out against the strands of the reinforcing tube and, due to the uniformity of the stress in the strands of the knit reinforcing tube, maintaining the length of the thus inflated blank not substantially less than the length of the blank prior to inflation thereof.

6. Hose comprising an inner hollow flexible tubular element with knit reinforcement thereabout, the knit reinforcement comprising interlooped strands forming a tube having rows of loops extending generally about the inner hollow flexible tubular element and wales of loops extending generally along the inner hollow flexible tubular element, the opposed sides of each loop which extend generally in the direction of the length of the wales being spaced apart a distance equal to at least six times the mean diameter of the strands and of the same order as the distance between adjacent wales and the respective strands of the knit reinforcing tube being under substantially uniform stress so that when fluid is admitted into the interior of the tubular element under sufficient pressure to cause the material thereof to swell out against the strands of the reinforcing tube the length of the hose is maintained not substantially less than its length prior to admission of the fluid under presure.

References Cited in the file of this patent

UNITED STATES PATENTS

| | | |
|---|---|---|
| 1,010,088 | Subers | Nov. 28, 1911 |
| 1,260,954 | Bauer | Mar. 26, 1918 |
| 1,569,140 | Querns | Jan. 12, 1926 |
| 1,644,116 | Fefel | Oct. 4, 1927 |
| 1,767,595 | Lombardi | June 24, 1930 |
| 1,972,755 | Blaisdell | Sept. 4, 1934 |
| 2,009,075 | Thompson | July 23, 1935 |
| 2,032,993 | Larkin | Mar. 3, 1936 |
| 2,044,324 | Page | June 16, 1936 |
| 2,057,789 | Petersen | Oct. 20, 1936 |
| 2,343,776 | Larkin | Mar. 7, 1944 |
| 2,493,675 | Kuehnel | Jan. 3, 1950 |